United States Patent
Ogumi et al.

(10) Patent No.: US 9,146,335 B2
(45) Date of Patent: Sep. 29, 2015

(54) OPTICAL LAYERED BODY, POLARIZER AND IMAGE DISPLAY DEVICE

(71) Applicant: Dai Nippon Printing Co., Ltd., Tokyo (JP)

(72) Inventors: Shoichiro Ogumi, Tokyo (JP); Junya Eguchi, Tokyo (JP); Gen Furui, Tokyo (JP); Seika Minakoshi, Tokyo (JP); Yukimitsu Iwata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 245 days.

(21) Appl. No.: 13/766,804

(22) Filed: Feb. 14, 2013

(65) Prior Publication Data

US 2013/0209737 A1  Aug. 15, 2013

(30) Foreign Application Priority Data

Feb. 14, 2012  (JP) ................................. 2012-029706
Feb. 14, 2012  (JP) ................................. 2012-029707

(51) Int. Cl.
*G02B 1/10* (2015.01)
*G02B 27/28* (2006.01)
*G02B 5/30* (2006.01)

(52) U.S. Cl.
CPC ................ *G02B 1/10* (2013.01); *G02B 1/105* (2013.01); *G02B 5/3025* (2013.01); *G02B 27/28* (2013.01); *Y10T 428/24355* (2015.01); *Y10T 428/24372* (2015.01)

(58) Field of Classification Search
CPC ........... G02B 1/10; G02B 1/105; G02B 1/14; G02B 27/28; G02B 5/3025; Y10T 428/24355; Y10T 428/24364; Y10T 428/24372; Y10T 428/2438; Y10T 248/24413
USPC .......................... 428/141, 142, 143, 144, 148
See application file for complete search history.

(56) References Cited

U.S. PATENT DOCUMENTS

| | | | |
|---|---|---|---|
| 2007/0104896 A1* | 5/2007 | Matsunaga et al. | 428/1.3 |
| 2007/0291367 A1 | 12/2007 | Hamamoto et al. | |
| 2010/0028600 A1* | 2/2010 | Kojima et al. | 428/141 |
| 2010/0097705 A1* | 4/2010 | Furui et al. | 359/599 |
| 2011/0194055 A1 | 8/2011 | Kodama et al. | |
| 2013/0222906 A1 | 8/2013 | Tsunekawa et al. | |

FOREIGN PATENT DOCUMENTS

| | | |
|---|---|---|
| CN | 103068571 A | 4/2013 |
| JP | H10-62622 A | 3/1998 |
| JP | 2003-131007 A | 5/2003 |

(Continued)

*Primary Examiner* — Maria Veronica Ewald
*Assistant Examiner* — Nancy Johnson
(74) *Attorney, Agent, or Firm* — Novak Druce Connolly Bove + Quigg LLP

(57) ABSTRACT

Provided is an optical layered body which sufficiently suppresses generation of interference fringes and curls, can make a hard coat layer thin, and prevent an increase in production cost. Provided is an optical layered body having a hard coat layer formed on one surface of a light-transmitting substrate, wherein the hard coat layer has a surface roughness on its surface and the surface roughness satisfies the following inequalities of θa and Kr where θa is an average inclination angle of the uneven part and Kr is Kurtosis of the unevenness:

$0.01° \leq \theta a \geq 0.10°$ $1 \leq Kr \leq 3$.

20 Claims, 1 Drawing Sheet

(56) References Cited

FOREIGN PATENT DOCUMENTS

| | | | |
|---|---|---|---|
| JP | 2003-205563 A | 7/2003 |
| JP | 2008-238646 A | 10/2008 |
| JP | 2008-262190 A | 10/2008 |
| JP | 2008-287072 A | 11/2008 |

* cited by examiner

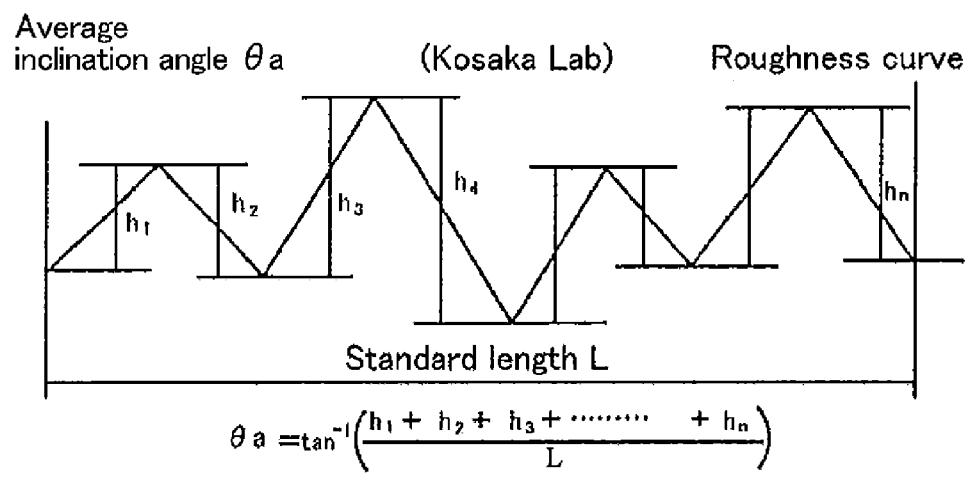

OPTICAL LAYERED BODY, POLARIZER AND IMAGE DISPLAY DEVICE

CROSS REFERENCE TO RELATED APPLICATIONS

This application claims priority to Application No. 2012-029706 filed in Japan on Feb. 14, 2012; and Application No. 2012-029707 filed in Japan on Feb. 14, 2012, under 35 U.S.C. §119; the entire contents of all are hereby incorporated by reference.

TECHNICAL FIELD

The present invention relates to an optical layered body, a polarizer, and an image display device.

BACKGROUND ART

In image display devices such as a cathode-ray tube display device (CRT), a liquid crystal display (LCD), a plasma display (PDP), an electroluminescence display (ELD), and a field emission display (FED), an optical layered body composed of functional layers having various performances such as a reflection prevention performance, an antistatic performance, a hard coating property, and a stain prevention property is formed.

Such an optical layered body is obtained by layering various functional layers on a light-transmitting substrate. Accordingly, in the case where a hard coat, for example, is formed on a light-transmitting substrate, uneven patterns called interference fringes appear due to the interference of the reflected light on the interface of the light-transmitting substrate and the hard coat layer and the reflected light on the hard coat surface and unevenness of the coating thickness to result in a problem that the appearance is deteriorated.

In order to prevent generation of the interference fringes, for example, in the case where a hard coat layer is formed on a light-transmitting substrate, it has been know to use a solvent which can penetrate the light-transmitting substrate to swell or dissolve the substrate for a resin composition for forming the hard coat layer (e.g., see Patent Literatures 1 and 2). Use of a resin composition containing such a solvent forms an impregnated layer by impregnating the light-transmitting substrate with the resin in the resin composition owing to the penetration of the solvent to the light-transmitting substrate, and as a result, the interface between the light-transmitting substrate and the hard coat layer can substantially be eliminated to prevent generation of the interference fringes.

However, in the case of a conventional optical layered body in which interference fringes are prevented by forming such an impregnated layer, it is required to make the impregnated layer thick for sufficiently preventing generation of interference fringes, and thus it is inevitably needed to increase the application amount of a composition to be used at the time of forming a hard coat layer.

Accordingly, it results in a problem that an optical layered body may become difficult to be made thin and may be curled, and if the application amount of the composition at the time of forming a hard coat layer formation is large, it also results in a problem that the thickness of the hard coat layer to be formed becomes uneven and the production cost becomes high.

As an optical layered body to be used for the surface of an image display device, an optical layered body (an antiglare film) is also known which is provided with an antiglare property by forming an antiglare layer having, on its surface, an uneven form on a light-transmitting substrate. However, although preventing generation of interference fringes, the antiglare film causes a problem of giving white muddiness and lowering the contrast.

CITATION LIST

Patent Literatures

Patent Literature 1: JP 2003-131007 A
Patent Literature 2: JP 2003-205563 A

SUMMARY OF INVENTION

Technical Problem

In view of the above state of the art, it is an object of the present invention to provide an optical layered body which sufficiently suppresses generation of interference fringes and curls, does not give any white muddiness, can make the hard coat layer thin, and prevent an increase in production cost, a polarizer and an image display device using the optical layered body.

Solution to Problem

The present invention provides an optical layered body having a hard coat layer formed on one surface of a light-transmitting substrate, wherein the hard coat layer has a surface roughness on its surface and the surface roughness satisfies the following inequalities of $\theta a$ and $Kr$ where $\theta a$ is an average inclination angle of the uneven part and $Kr$ is Kurtosis of the unevenness:

$$0.01° \leq \theta a \leq 0.10°$$

$$1 \leq Kr \leq 3.$$

The surface roughness of the hard coat layer preferably satisfies the following inequality of $Ra$ when $Ra$ is defined as the arithmetic means roughness of the unevenness:

$$0.02 \text{ μm} \leq Ra \leq 0.10 \text{ μm}.$$

The surface roughness of the hard coat layer preferably satisfies the following inequality of $\lambda a$ where $\lambda a$ is an average wavelength defined as $\lambda a = 2\pi \times (Ra/\tan(\theta a))$:

$$200 \text{ μm} \leq \lambda a \leq 800 \text{ μm}.$$

In the optical layered body of the present invention, the hard coat layer preferably contains inorganic oxide fine particles and a binder resin, and the inorganic oxide fine particles are preferably hydrophobized inorganic oxide fine particles.

The above-mentioned inorganic oxide fine particles are formed into agglomerates to be contained in the hard coat layer, and the average particle diameter of the agglomerates is preferably 100 nm to 2.0 μm.

The optical layered body of the present invention has a low refractive index layer on the surface of the hard coat layer in the side opposite to the light-transmitting substrate side, and the low refractive index layer preferably has a surface roughness corresponding to the surface roughness formed on the surface of the hard coat layer in the surface side opposite to the hard coat layer side.

The present invention also provides a polarizer having a polarizing element, wherein the polarizer has the above-mentioned optical layered body on the polarizing element surface.

The present invention also provides an image display device having the above-mentioned optical layered body or the above-mentioned polarizer.

Hereinafter, the present invention will be described in detail.

The prevent inventors made various investigations on an optical layered body with a configuration having a hard coat layer on one surface of a light-transmitting substrate, and consequently have found that formation of a specified surface roughness on the surface of the hard coat layer (in the side opposed to the light-transmitting substrate) can preferably prevent generation of interference fringes, make the optical layered body thin since there is no need to form an impregnated layer on the light-transmitting substrate, and prevents generation of curls and an increase in production cost. These findings have now led to completion of the present invention.

In the optical layered body of the present invention, since there is no need to form an impregnated layer on the light-transmitting substrate, there is an advantageous effect to widen both of a range of an option of a material for the light-transmitting substrate and a range of an option of a material for a solvent to be used in a composition for forming the hard coat layer as compared with those for a conventional optical layered body.

Hitherto, an optical layered body (an antiglare film) having a surface roughness on the surface of a hard coat layer to provide an antiglare property has been known; however the optical layered body of the present invention is different from such a conventional antiglare film. That is, the surface roughness formed on the surface of the hard coat layer of the optical layered body of the present invention has lower height and furthermore moderate inclination angle of the uneven part than the surface roughness formed on the surface of the conventional antiglare film. Consequently, the optical layered body of the present invention having such a surface roughness on the hard coat layer cannot give an antiglare property like the conventional antiglare film. On the other hand, according to the present invention, it is made possible to obtain an optical layered body generating no white muddiness by outside light, which is a problem in the antiglare film, and providing an image with excellent contrast. That is, the optical layered body of the present invention can be used for improving visibility of an image display device.

The optical layered body of the present invention has a hard coat layer on one surface of a light-transmitting substrate.

The light-transmitting substrate is preferably a substrate which is provided with smoothness and heat resistance and is excellent in mechanical strength. Specific examples of a material forming the light-transmitting substrate include thermoplastic resins such as polyesters (polyethylene terephthalate, polyethylene naphthalate), cellulose triacetate, cellulose diacetate, cellulose acetate butyrate, polyester, polyamide, polyimide, polyether sulfones, polysulfone, polypropylene, polymethylpentene, polyvinyl chloride, polyvinyl acetal, polyether ketones, polymethyl methacrylate, polycarbonates, and polyurethanes, and glass. Preferable examples thereof include polyesters (polyethylene terephthalate and polyethylene naphthalate) and cellulose triacetate.

It is preferable that in the light-transmitting substrate, the above-mentioned materials are used in a film-shaped body with excellent flexibility and also in a plate-shaped body corresponding to the use aspect requiring hardness.

Besides, examples of the light-transmitting substrate include films of amorphous olefin polymers (Cyclo-Olefin-Polymer: COP) having an alicyclic structure. They are substrates of norbornene polymers, monocyclic olefin polymers, cyclic conjugated diene polymers, vinyl alicyclic hydrocarbon polymers, or the like, and examples thereof include ZEONEX and ZEONOR (norbornene resins) manufactured by ZEON CORPORATION; SUMILITE FS-1700 manufactured by SUMITOMO BAKELITE CO., LTD.; ARTON (deformed norbornene resins) manufactured by JSR CORPORATION; APEL (cyclic olefin copolymers) manufactured by Mitsui Chemicals, Inc.; TOPAS (cyclic olefin copolymers) manufactured by Ticona; OPTOREZ OZ-1000 series (alicyclic acrylic resins) manufactured by Hitachi Chemical Co., Ltd.; and the like.

FV series (low birefringence and low photoelastic films) manufactured by Asahi Kasei Chemicals Co., Ltd. are also preferable as a substituting substrate for triacetyl cellulose.

The thickness of the light-transmitting substrate is preferably 20 to 300 μm and more preferably 30 μm as a lower limit and 200 μm as an upper limit in the case of a film-shaped body. In the case where the light-transmitting substrate is a plate-shaped body, the thickness may be beyond these thicknesses.

At the time of formation of the hard coat layer thereon, the light-transmitting substrate may be subjected to a physical or chemical treatment such as a corona discharge treatment or oxidation treatment, or may previously be coated with an anchor agent or a coating material called primer in order to improve the adhesiveness.

Further, in the case where triacetyl cellulose, which is often used for mainly a light-transmitting substrate for LCD, is used as a material and it is aimed to make a display device thin, the light-transmitting substrate is preferable to have a thickness of 20 to 65 μm.

The hardness of the hard coat layer is preferably H or higher and more preferably 2H or higher when measured by a pencil hardness test (load 4.9 N) according to JIS K5600-5-4 (1999).

In the optical layered body of the present invention, the hard coat layer is formed on one surface of the light-transmitting substrate and has a surface roughness on its surface.

In the optical layered body of the present invention, the surface roughness formed on the surface of the hard coat layer satisfies the following inequalities of $\theta a$ and $Kr$ where $\theta a$ is an average inclination angle of the uneven part and $Kr$ is Kurtosis of the unevenness:

$$0.01° \leq \theta a \leq 0.10°$$

$$1 \leq Kr \leq 3.$$

The reason for prevention of the interference fringes by the surface roughness formed on the surface of the hard coat layer is because light reflected on the hard coat layer surface is diffused and becomes incoherent light. In order to diffuse the light, it is necessary that the uneven surface has inclination and its index is an average inclination angle $\theta a$.

In the optical layered body of the present invention, the lower limit of the average inclination angle $\theta a$ of the uneven part is 0.01°. If it is lower than 0.01°, the inclination is too insufficient to prevent the interference fringes. The lower limit is more preferably 0.03° and further preferably 0.04°. The upper limit of the average inclination angle $\theta a$ of the uneven part is 0.10°. If it exceeds 0.10°, since the inclination angle of the uneven part is excessively high, a problem of white muddiness due to diffusion reflection of outside light is caused. The upper limit is more preferably 0.09° and further preferably 0.08°.

In the present invention, Kurtosis $Kr$ of the unevenness is 1 or higher and 3 or lower. Kurtosis $Kr$ is also referred to as peakedness, and it means that the projected parts or recessed parts have a steeper shape as the value is higher. It shows that even if the average inclination angle satisfies the above-mentioned range, the inclination angle distribution is biased. That is, it implies that the inclination angle is locally high but the inclination angle is low in other parts. In such a case, in the part having a locally high inclination angle, the light diffusion becomes significant to an excess extent and the problem of white muddiness may possibly occur and on the other hand, in the part having a low inclination angle, the interference fringes cannot be suitably prevented. If Kr is 3 or lower, the bias of the inclination angle distribution is properly suppressed, and the interference fringes can be prevented suitably and at the same time, the white muddiness can also be suppressed. The minimum value of Kr is 1 in terms of definition.

In the present invention, the surface roughness of the hard coat layer preferably satisfies the following inequality of Ra when Ra is defined as the arithmetic means roughness of the unevenness:

0.02 μm≤Ra≤0.10 μm.

In the present invention, the size (height) of the respective projected parts of the surface roughness is preferable to be controlled, and its index is the arithmetic means roughness Ra.

The lower limit of the arithmetic means roughness Ra of the unevenness is 0.02 μm. If Ra is lower than 0.02 μm, the size (height) of the respective projected parts is so small relatively to the wavelength of light that a diffusion effect may not be obtained. The lower limit is more preferably 0.03 μm and even more preferably 0.04 μm. The upper limit of Ra is 0.10 μm. If Ra exceeds 0.10 μm, the respective projected parts are so large as to deflect transmitted light, and therefore, clear images may not be obtained. The upper limit is more preferably 0.09 μm and even more preferably 0.08 μm.

In the present invention, the average wavelength λa defined as $\lambda a = 2\pi \times (Ra/\tan(\theta a))$ is preferably 200 μm or longer and 800 μm or shorter.

The average wavelength λa is a parameter indicating the average interval of the unevenness. If the average wavelength λa is shorter than 200 μm, the unevenness is too small to prevent the interference fringes, or the inclination angle in the uneven plane is changed significantly so that the white muddiness may be seen. If the average wavelength λa exceeds 800 μm, the inclination angle in the uneven plane is changed slightly so that the interference fringes may not be prevented suitably. The lower limit of the average wavelength λa is more preferably 300 μm, and the upper limit thereof is more preferably 600 μm.

The ten-point mean roughness (Rz) of the surface roughness formed on the surface of the hard coat layer is preferably lower than 0.5 μm, and the upper limit thereof is more preferably 0.3 μm. If Rz is 0.5 μm or higher, the unevenness is significant so that the white muddiness may be seen. The lower limit of Rz is not particularly limited, and may be properly adjusted in a range where the diffusion effect is obtained.

In this specification, θa, Kr, Ra, and Rz described above are values determined for every standard length of a roughness curve obtained by the method in accordance with JIS B 0601-1994. In this specification, Ra and Rz are values defined in JIS B 0601-1994, and θa is a value defined in the description of the manual (revised 1995. 07. 20) for a surface roughness measurement device: SE-3400 (Kosaka Laboratory Ltd.) and can be determined as arc tangent of the sum of heights ($h_1 + h_2 + h_3 + \ldots + h_n$) of projected parts existing in a standard length L: arc tangent $\theta a = \tan^{-1}\{(h_1 + h_2 + h_3 + \ldots + h_n)/L\}$, as shown in FIG. 1.

Kr is a value defined by the following expression:

$$Kr = \frac{1}{Rq^4 \cdot l} \int_0^l f(x)^4 dx \quad \text{[Mathematical Expression 1]}$$

wherein, l represents the standard length; f(x) represents the roughness curve; Rq represents root-mean-square roughness and defined as the following expression:

$$Rq = \sqrt{\frac{1}{l}\int_0^l f(x)^2 dx} \quad \text{[Mathematical Expression 2]}$$

These θa, Kr, Ra, and Rz can be determined by measuring with, for example, a surface roughness measurement device: SE-3400 manufactured by Kosaka Laboratory Ltd., or the like.

In order to obtain the above-mentioned specified surface roughness, the following methods are exemplified: (1) a composition containing fine particles and a binder resin is applied to a light-transmitting substrate to form an unevenness; (2) a composition containing two kind of binder resins incompatible with each other is applied to a light-transmitting substrate to form an unevenness by phase separation; (3) a binder resin is applied to a light-transmitting substrate and an unevenness is formed by transfer with an embossing roll having a surface roughness; and the like. Among these methods, from the viewpoint of production easiness, the method (1) is preferable and hereinafter, it will be described in detail.

The hard coat layer preferably contains inorganic oxide fine particles.

The inorganic oxide fine particles are a material for forming the surface roughness on the surface of the hard coat layer, and in the optical layered body of the present invention, it is preferable that the inorganic oxide fine particles are formed into agglomerates to be contained in the hard coat layer, and the surface roughness on the surface of the hard coat layer is formed by the agglomerates of the inorganic oxide fine particles.

Examples of the inorganic oxide fine particles include silica fine particles, alumina fine particles, zirconia fine particles, titania fine particles, tin oxide fine particles, ATO particles, zinc oxide fine particles, and the like.

The inorganic oxide fine particles are preferably surface-treated. If the inorganic oxide fine particles are surface-treated, the distribution of the agglomerates of the inorganic oxide fine particles can be controlled suitably in the hard coat layer, and the inorganic oxide fine particles themselves are also improved in chemical resistance and saponification resistance.

The surface treatment is preferably a hydrophobization treatment and examples thereof include a method for treating the inorganic oxide fine particles with a surface treatment agent of a silane compound having a methyl or an octyl group, and the like, and among the methods, a method for treatment with a silane compound having an octyl group is suitable.

Herein, in general, hydroxyl groups exist on the surface of the inorganic oxide fine particle, and the hydroxyl groups on the surface of the inorganic oxide fine particle are decreased by carrying out the surface treatment and further, the ratio of the hydroxyl groups on the surface of the inorganic oxide fine particle can be adjusted by adjusting the kind and treatment amount of the surface treatment agent. Accordingly, the agglomeration degree of the inorganic oxide fine particles can be controlled and it is easy to form the above-described specified surface roughness on the surface of the hard coat layer.

The inorganic oxide fine particles are preferably amorphous. In the case where the inorganic oxide fine particles are crystalline, the Lewis acidity of the inorganic oxide fine particles becomes high due to the lattice defects in the crystalline structure, and thus, excess agglomeration of the inorganic oxide fine particles may not be controlled.

As the inorganic oxide fine particles, for example, fumed silica is suitably used since silica itself tends to easily agglomerate and thus is easy to form agglomerates as described below. The fumed silica refers to amorphous silica prepared by a dry method and having a particle diameter of 200 nm or smaller, and is obtained by vapor phase reaction of a silicon-containing volatile compound. Specific examples thereof include those generated by hydrolyzing a silicon compound, e.g., $SiCl_4$, in flames of oxygen and hydrogen. Specifically, examples thereof include AEROSIL R805 (manufactured by Nippon Aerosil Co., Ltd.) and the like.

The content of the inorganic oxide fine particles is not particularly limited, and preferably 0.1 to 5.0 wt % in the hard coat layer. If it is less than 0.1 wt %, the specified surface roughness cannot be formed on the surface of the hard coat layer, and thus, the interference fringes may not be prevented, and if it exceeds 5.0 wt %, agglomerates are formed excessively and since the inner diffusion occurs and/or a significant surface unevenness is formed on the hard coat layer, the problem of white muddiness may possibly be caused. The lower limit of the content is more preferably 0.5 wt % and the upper limit thereof is more preferably 3.0 wt %.

The inorganic oxide fine particles preferably have an average primary particle diameter of 1 to 100 nm. If it is smaller than 1 nm, the specified surface roughness may not be formed on the surface of the hard coat layer and if it exceeds 100 nm, light is diffused by the inorganic oxide fine particles, and the darkroom contrast of an image display device using the optical layered body of the present invention may possibly become inferior. The lower limit of the diameter is more preferably 5 nm and the upper limit thereof is more preferably 50 nm.

The average primary particle diameter of the inorganic oxide fine particles is a value measured from an image of a cross section by an electron microscope (a transmission type such as TEM or STEM and magnification is preferably 50000 or more) by with the use of image processing software.

The inorganic oxide fine particle preferably has a spherical shape in a single particle state. If the organic oxide fine particle has such a spherical shape in a single particle state, in the case where the optical layered body of the present invention is applied for an image display device, displayed images with high contrast can be obtained.

The "spherical shape" includes, for example, a truly spherical shape, an elliptical shape and the like, and means to exclude a so-called an infinite shape.

In the present invention, the agglomerates of the inorganic oxide fine particles preferably form a structure in which the inorganic oxide fine particles are connected like a beaded shape (like a necklace of pearles) in the hard coat layer.

If the inorganic oxide fine particles form agglomerates connected like a beaded shape in the hard coat layer, the projected parts have a smooth shape with low inclination due to the agglomerates, and because of that, it is made easy to form the surface surface roughness of the hard coat layer into the specified surface roughness.

Examples of the structure in which the inorganic oxide fine particles form like curablea beaded shape include arbitrary structures such as a structure in which the inorganic oxide fine particles are linearly and continuously connected (straight chain structure); a structure in which a plurality of the straight chain structures are entwined; and a brunched structure in which the straight chain structure has one or more side chains formed by continuously connecting a plurality of the inorganic oxide fine particles.

The agglomerates of the inorganic oxide fine particles have an average particle diameter of preferably 100 nm to 2.0 μm. If it is smaller than 100 nm, the specified surface roughness may not be formed on the surface of the hard coat layer, and if it exceeds 2.0 μm, light is diffused by the agglomerates of the inorganic oxide fine particles and the darkroom contrast of an image display device using the optical layered body of the present invention may possibly become inferior. The lower limit of the average particle diameter of the agglomerates is more preferably 200 nm and the upper limit thereof is more preferably 1.5 μm.

The average particle diameter of the agglomerates of the inorganic oxide fine particles is obtained by selecting a 5 μm square area in which many agglomerates of the inorganic oxide fine particles are contained from a cross section observed by an electron microscope (magnification of about 10000 to 20000), measuring the particle diameter of each agglomerate of the inorganic oxide fine particles in the area, and calculating the average of the particle diameter of the 10 largest agglomerates of the inorganic oxide fine particles. The "particle diameter of the agglomerates of the inorganic oxide fine particles" is measured as a slant distance between a combination of two straight lines which form the maximum slant distance in the case where a cross section of each agglomerate of the inorganic oxide fine particles is sandwiched with arbitrary two parallel straight lines. The particle diameter of the agglomerates of the inorganic oxide fine particles may be calculated using image analysis software.

The thickness of the hard coat layer is preferably 2.0 to 7.0 μm. If it is thinner than 2.0 μm, the hard coat layer surface may be easily scratched, and if it is thicker than 7.0 μm, not only the hard coat layer cannot be made thin but also the hard coat layer may tend to be cracked and cause a curling problem. The thickness of the hard coat layer is more preferably in a range of 2.0 to 5.0 μm. The thickness of the hard coat layer can be measured by observing a cross section with a microscope.

In the hard coat layer, the inorganic oxide fine particles are dispersed in a binder resin.

The binder resin preferably has adjusted polarity corresponding to the hydrophobicity of the inorganic oxide fine particles treated by the hydrophobization treatment. An example of a method for adjusting the polarity of the binder resin includes adjustment of a hydroxyl value of the binder resin. Adjustment of the polarity of the binder resin to proper makes it possible to suitably control the agglomeration and dispersion of the inorganic oxide fine particles and makes it easy to form the specified surface roughness.

As the binder resin, a transparent binder resin is preferable and, for example, the binder resin is preferably those obtained by curing ionizing-radiation curable resins, which are cured by ultraviolet rays or electron beams, by ultraviolet ray or electron beam radiation.

In this specification, the "resin" is a concept including monomers, oligomers, polymers, and the like unless otherwise specified.

Examples of the ionizing-radiation curable resins include compounds having one or more unsaturated bonds such as compounds having functional groups of acrylates or the like. Examples of compounds having one unsaturated bond may include ethyl (meth)acrylate, ethylhexyl (meth)acrylate, styrene, methylstyrene, N-vinylpyrrolidone, and the like.

Examples of compounds having two or more unsaturated bonds may include polyfunctional compounds such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra (meth)acrylate, dipentaerythritol penta(meth)acrylate, tripentaerythritol octa (meth)acrylate, tetrapentaerythritol deca (meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth)acrylate, and ditrimethylolpropane tetra(meth)acrylate; and the like. Among the compounds, pentaerythritol tetraacrylate (PETTA) is suitably used. In this specification, "(meth)acrylate" refers to methacrylate and acrylate. In the present invention, as the ionizing-radiation curable resin, those obtained by modifying the above-mentioned compounds with PO, EO, or the like are also usable.

Besides the compounds, polyester resins, polyether resins, acrylic resins, epoxy resins, urethane resins, alkyd resins, spiroacetal resins, polybutadiene resins, polythiol-polyene resins, and the like having relatively low molecular weights and having unsaturated double bonds are also usable as the ionizing-radiation curable resin.

The ionizing-radiation curable resin can be used in combination with a solvent-drying type resin (resin such as a thermoplastic resin which can be formed into a coating film merely by drying out a solvent added for adjusting the solid matter at the time of coating). At the time of forming the hard coat layer, combination use of the solvent-drying type resin can effectively prevent coating film defects on the coating solution application surface.

The solvent-drying type resin to be used in combination with the ionizing-radiation curable resin is not particularly limited, and generally, a thermoplastic resin can be used.

The thermoplastic resin is not particularly limited and examples thereof may include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, rubber and elastomer, and the like. The thermoplastic resin is preferably non-crystalline and soluble in an organic solvent (particularly a common solvent in which a plurality of polymers and curable compounds can be dissolved). From the viewpoints of transparency and weathering resistance, styrene resins, (meth)acrylic resins, alicyclic olefin resins, polyester resins, cellulose derivatives (cellulose esters, etc.), and the like are preferable.

The hard coat layer may further contain a thermosetting resin.

The thermosetting resin is not particularly limited and examples thereof may include phenolic resins, urea resins, diallyl phthalate resins, melamine resins, guanamine resins, unsaturated polyester resins, polyurethane resins, epoxy resins, aminoalkyd resins, melamine-urea co-condensed resins, silicon resins, polysiloxane resins, and the like.

The hard coat layer containing inorganic oxide fine particles and a binder resin can be formed by, for example, applying a composition for a hard coat layer containing the inorganic oxide fine particles, monomer components of the binder resin, and a solvent to a light-transmitting substrate, drying the composition to form a coating film, and curing the coating film by irradiation of ionizing radiation or the like.

Examples of the solvent contained in the composition for a hard coat layer may include alcohols (e.g., methanol, ethanol, propanol, isopropanol, n-butanol, sec-butanol, tert-butanol, benzyl alcohol, PGME, ethylene glycol), ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halocarbons (dichloromethane, dichloroethane, etc.), esters (methyl acetate, ethyl acetate, butyl acetate, etc.), cellosolves (methyl cellosolve, ethyl cellosolve, etc.), cellosolve acetates, sulfoxides (dimethyl sulfoxide, etc.), amides (dimethylformamide, dimethylacetamide, etc.), and the like, and their mixtures may be used.

Further, the composition for a hard coat layer preferably contains a photopolymerization initiator.

The photopolymerization initiator is not particularly limited and known initiators can be used, and specific examples thereof include acetophenones, benzophenones, Michler's benzoyl benzoate, α-amyloxim ester, thioxanthones, propiophenones, benzyls, benzoines, and acylphosphine oxides. A photosensitizer is also preferably mixed for use, and specific examples thereof include n-butylamine, triethylamine, poly-n-butylphosphine, and the like.

In the case where the binder resin is a resin having a radical polymerizable unsaturated group, as the photopolymerization initiator, acetophenones, benzophenones, thioxanthones, benzoin, benzoin methyl ether, and the like are preferably used alone or in the form of a mixture. In the case where the binder resin is a resin having a cation polymerizable functional group, as the photopolymerization initiator, aromatic diazonium salts, aromatic sulfonium salts, aromatic iodonium salts, metallocene compounds, benzoin sulfonic acid esters, and the like are preferably used alone or in the form of a mixture.

The content of the photopolymerization initiator in the composition for a hard coat layer is preferably 0.5 to 10.0 parts by weight based on 100 parts by weight of the binder resin. If it is lower than 0.5 parts by weight, the hard coat performance of the hard coat layer to be formed may become insufficient, and if it exceeds 10.0 parts by weight, adversely, curing may possibly be inhibited, and therefore, it is not preferable.

The content ratio of a raw material (solid matter) in the composition for a hard coat layer is not particularly limited and it is generally 5 to 70 wt % and particularly preferably 25 to 60 wt %.

The composition for a hard coat layer may contain conventionally known dispersants, surfactants, antistatic agents, silane coupling agents, thickeners, coloration prevention agents, coloring agents (pigments and dyes), defoaming agents, leveling agents, flame retardants, ultraviolet absorbents, adhesives, polymerization inhibitors, antioxidants, surface-reforming agents, lubricants, and the like corresponding to the aims to increase the hardness of the hard coat layer, to suppress the curing shrinkage, to control the refractive index, and the like.

As the leveling agent, silicone oil, fluoro surfactants, and the like are preferable since they can avoid the hard coat layer to have a Benard cell structure. In the case where a resin composition containing a solvent is coated and dried, a surface tension difference or the like is generated between the coating film surface and the inner surface in a coating film and accordingly, a large number of convection currents are caused in the coating film. The structure generated by the convection currents is referred to as the Benard cell structure, and it becomes a cause of a problem such as orange peel or defective coating on the hard coat layer to be formed.

The Benard cell structure may possibly deteriorate the appearance of the optical layered body since the unevenness on the surface of the hard coat layer becomes too significant. If the leveling agent is used, this convection current can be prevented and not only a hard coat layer film free from defects or unevenness can be obtained but also the surface roughness on the surface of the hard coat layer can be adjusted easily.

A method for preparing the composition for a hard coat layer is not particularly limited if the respective components can be mixed evenly, and for example, a known device such as a paint shaker, a bead mill, a kneader, a mixer, or the like can be employed for the preparation.

A method for applying the composition for a hard coat layer to a light-transmitting substrate is not particularly limited, and examples thereof may include known methods such as a spin coating method, a dipping method, a spraying method, a die coating method, a bar coating method, a roll coater method, a meniscus coater method, a flexo-printing method, a screen printing method, a bead coater method, and the like.

After the composition for a hard coat layer is applied by any of the above-mentioned methods, the formed coating film is transported to a heated zone for drying, and the coating film is dried by any of various known methods to evaporate the solvent. Herein, the distribution state of agglomerates of the inorganic oxide fine particles can be adjusted by selecting a relative solvent evaporation rate, a solid matter concentration, an application solution temperature, a drying temperature, a velocity of drying air blow, a drying time, an ambient solvent concentration in the drying zone, and the like.

Particularly, a method for adjusting the distribution state of agglomerates of the inorganic oxide fine particles by selecting the drying condition is simple and easy and thus preferable. Specifically, it is preferable that the drying temperature is 30 to 120° C., and that the velocity of drying air blow is 0.2 to 50 m/second, and the drying treatment properly adjusted within the range may be carried out once or a plurality of times to adjust the distribution state of agglomerates of the inorganic oxide fine particles to a desired state.

Examples of a method for irradiation of ionizing radiation at the time of curing the coating film after the drying include methods using light sources such as a ultrahigh-pressure mercury lamp, a high-pressure mercury lamp, a low-pressure mercury lamp, a carbon arc lamp, a black-light fluorescent lamp, and a metal halide lamp.

The wavelength of ultraviolet rays to be used may be a wavelength in a range of 190 to 380 nm. Specific examples of an electron beam source include various kinds of electron accelerators such as a Cockcroft-Walton type accelerator, a Van de Graaff type accelerator, a resonance transformer type accelerator, an insulation core transformer type accelerator, a linear type accelerator, a dynamitron type accelerator, and a high frequency type accelerator.

The optical layered body of the present invention preferably has a total light transmittance of 90% or higher. If it is lower than 90%, in the case where the optical layered body of the present invention is installed on the surface of an image display device, the color reproducibility and the visibility may possibly be deteriorated. The total light transmittance is more preferably 91% or higher.

The total light transmittance can be measured by a method in accordance with JIS K-7361 by using a haze meter (product number; HM-150, manufactured by MURAKAMI COLOR RESEARCH LABORATORY).

The optical layered body of the present invention preferably has a haze of less than 1%. If it exceeds 1%, the visibility may be lowered, that is, the contrast is low, in the case where the optical layered body of the present invention is installed on the surface of an image display device. It is preferably 0.5% or lower, and more preferably 0.3% or lower.

The haze can be measured by a method in accordance with JIS K-7136 by using a haze meter (product number; HM-150, manufactured by MURAKAMI COLOR RESEARCH LABORATORY).

The optical layered body of the present invention preferably has a transmission image clarity of 75 to 95% with 0.125 mm comb width and 95% or higher with 2.0 mm comb width. If the transmission image clarity with 0.125 mm comb width is lower than 75%, the clarity of an image at the time of image display may be deteriorated and the image quality may possibly become inferior. If it exceeds 95%, the interference fringes may not be prevented suitably. The transmission image clarity with 0.125 mm comb width is more preferably 80 to 90%. If the transmission image clarity with 2.0 mm comb width is lower than 95%, the clarity of an image may be deteriorated, and white muddiness due to diffusion reflection of outside light may possibly be generated.

The transmission image clarity can be measured by a method in accordance with a transmission method for image clarity defined in JIS K-7105 by using an image clarity measurement device (product number; ICM-1T, manufactured by Suga Test Instruments Co., Ltd.).

The optical layered body of the present invention preferably has a low refractive index layer on the surface of the hard coat layer in the side opposite to the light-transmitting substrate side, since the low refractive index layer can lower background reflections from surrounding and can improve the transmittance.

In the case where the optical layered body of the present invention has the low refractive index layer on the hard coat layer, the low refractive index layer is required to have a surface roughness corresponding to the specified surface roughness formed on the surface of the hard coat layer on the surface in the side opposite to the hard coat layer side. The phrase, the surface roughness corresponding to the specifies surface roughness formed on the surface of the hard coat layer, means that the surface roughness formed on the low refractive index layer satisfies the average inclination angle θa of the uneven part and Kurtosis Kr of the unevenness, and preferably satisfies the conditions of the arithmetic means roughness Ra and the average wavelength λa.

The low refractive index layer is a layer serving a role for lowering the reflectance when light from outside (e.g., a fluorescent lamp and natural light) is reflected on the surface of an optically laminated body.

The low refractive index layer is preferably composed of any of 1) a resin containing low refractive index particles such as silica or magnesium fluoride; 2) a fluororesin serving as a low refractive index resin; 3) a fluororesin containing silica or magnesium fluoride; and 4) a thin film of a low refractive index substance such as silica or magnesium fluoride; and the like. As the resin other than the fluororesin, a resin which is similar to the binder resin constituting the hard coat layer can be used.

The silica is preferably a hollow silica fine particle and such a hollow silica fine particle can be prepared by, for example, the production method disclosed in Examples of JP-A 2005-099778.

The low refractive index layer has a refractive index of preferably 1.45 or lower and particularly preferably 1.42 or lower.

The thickness of the low refractive index layer is not particularly limited, and generally it may be set properly in a range of about 30 nm to about 1 μm.

The low refractive index layer is effective even in a monolayer state, but in order to adjust the lowest reflectance to lower or the lowest reflectance to higher, it is also properly possible to form two or more low refractive index layers. In the case where two or more low refractive index layers are formed, it is preferable that the refractive index and thickness of the respective low refractive index layers are different from one another.

As the fluororesin, a polymerizable compound containing at least a fluorine atom in the molecule or its polymer may be used. The polymerizable compound is not particularly limited, and preferred are those having a curing reactive group such as a functional group cured by ionizing radiation or a polar group cured by heating. Compounds having these reactive groups simultaneously may also be used. As different from the polymerizable compound, the polymer does not have any of the reactive groups.

As the polymerizable compound having a functional group cured by ionizing radiation, a wide variety of fluorine-containing monomers having ethylenically unsaturated bonds can be used. Specific examples thereof may include fluoroolefins (e.g., fluoroethylene, vinylidene fluoride, tetrafluoroethylene, hexafluoropropylene, perfluorobutadiene, perfluoro-2,2-dimethyl-1,3-dioxole, etc.). Examples of those having a (meth)acryloyloxy group include (meth)acrylate compounds having fluorine atoms in the molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, methyl α-trifluoromethacrylate, and ethyl α-trifluoromethacrylate; and fluorine-containing polyfunctional (meth)acrylic acid ester compounds having a C1-C14 fluoroalkyl group, fluorocycloalkyl group, or fluoroalkylene group having at least three fluorine atoms in the molecule and also at least two (meth)acryloyloxy groups.

The polar groups to be cured by heating are preferably hydrogen bond-forming groups such as a hydroxyl group, a carboxyl group, an amino group, and an epoxy group. These groups are excellent not only in adhesion to the coating film but also in affinity with inorganic fine particles such as silica. Examples of the polymerizable compound having a thermosetting polar group include 4-fluoroethylene-perfluoroalkylvinyl ether copolymers; fluoroethylene-hydrocarbon vinyl ether copolymers; and fluoro-modified products of resins such as an epoxy resin, a polyurethane resin, a cellulose resin, a phenolic resin, and a polyimide resin.

Examples of the polymerizable compound having the functional group cured by ionizing radiation and the polar group cured by heating may include partially or completely fluorinated alkyl, alkenyl, and aryl esters of acrylic or methacrylic acid; completely or partially fluorinated vinyl ethers; completely or partially fluorinated vinyl esters; completely or partially fluorinated vinyl ketones; and the like.

Examples of the fluororesin may include the followings:

Polymers of a monomer or monomer mixture containing at least one kind of fluorine-containing (meth)acrylate compound of the polymerizable compound having an ionizing-radiation curable group; copolymers of at least one kind of the fluorine-containing (meth)acrylate compound with a (meth)acrylate compound having no fluorine atom in the molecule such as methyl (meth)acrylate, ethyl (meth)acrylate, propyl (meth)acrylate, butyl (meth)acrylate, or 2-ethylhexyl (meth)acrylate; homopolymers and copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, or hexafluoropropylene. Silicone-containing vinylidene fluoride copolymers obtained by adding a silicone component to these copolymers are also usable. Examples of the silicon component in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methylhydrosilicone, silanol group-containing silicone, alkoxy group-containing silicone, phenolic group-containing silicone, methacrylate-modified silicone, acrylate-modified silicone, amino-modified silicone, carboxylic acid-modified silicone, carbinol-modified silicone, epoxy-modified silicone, mercapto-modified silicone, fluoro-modified silicone, polyether-modified silicone, and the like. Among these, those having a dimethylsiloxane structure are preferable.

Non polymers or polymers made of the following compounds are also usable as the fluororesin. That is, compounds obtained by reaction of a fluorine-containing compound having at least one isocyanato group in the molecule with a compound having at least one functional group reactive with the isocyanato group such as an amino group, a hydroxyl group, or a carboxyl group in the molecule; compounds obtained by reaction of a fluorine-containing polyol such as a fluorine-containing polyether polyol, a fluorine-containing alkyl polyol, a fluorine-containing polyester polyol, or a fluorine-containing ε-caprolactone-modified polyol with a compound having an isocyanato group; and the like.

Together with the fluorine atom-containing polymerizable compounds and polymers, the respective binder resins described for the hard coat layer may be mixed and used. Further, a curing agent for curing the reactive groups or the like and various kinds of additives and solvents for improving the coatability and providing an anti-staining property may be used properly.

In the formation of the low refractive index layer, the viscosity of a composition for a low refractive index layer containing the above-mentioned materials is adjusted to a range of preferably 0.5 to 5 mPa·s (25° C.) and more preferably 0.7 to 3 mPa·s (25° C.) where a preferable application property is obtained. Accordingly, a layer excellent in visible light reflection prevention can be actually formed, a uniform thin film without application nonuniformity can be formed, and a low refractive index layer particularly excellent in adhesion can be formed.

A curing means for the resin may be same as that described for the hard coat layer. In the case where a heating means is employed for the curing treatment, it is preferable to add a thermal polymerization initiator for starting polymerization of the polymerizable compound by generating, for example, radicals through heating to the fluororesin composition.

The thickness (nm) $d_A$ of the low refractive index layer preferably satisfies the following expression (1):

$$d_A = m\lambda/(4n_A) \quad (1)$$

wherein, $n_A$ represents a refractive index of the low refractive index layer; m represents a positive odd numeral and preferably 1; $\lambda$ is a wavelength and represents a value preferably in a range of 480 to 580 nm.

In the present invention, the low refractive index layer preferably satisfies the following expression (2):

$$120 < n_A d_A < 145 \quad (2)$$

in terms of lowering the refractive index.

The optical layered body of the present invention has a contrast ratio of preferably 80% or higher and more preferably 90% or higher. If it is lower than 80%, in the case where the optical layered body of the present invention is installed on the display surface, the darkroom contrast becomes inferior and the visibility may possibly be deteriorated. In this specification, the contrast ratio is a value measured in accordance with the following method.

That is, using a device obtained by installing a diffuser in a cold cathode-ray tube light source as a back light unit, a measurement sample, and two polarizers (AMN-3244TP, manufactured by SAMSUNG), the contrast is defined as a value ($L_{max}/L_{min}$) calculated by dividing the luminance $L_{max}$ of the light which passes in the case where the polarizers are installed in a parallel nicol by the luminance $L_{min}$ of the light which passes in the case where the polarizers are installed in a cross nicol, and the contrast ratio is defined as a value ($L_1/L_2$)×100(%) calculated by dividing the contrast ($L_1$) in the case where the measurement sample is an optical layered body (light-transmitting substrate+hard coat layer, etc.) by the contrast ($L_2$) in the case where the measurement sample is a light-transmitting substrate.

The brightness is measured in a dark room. A color hue luminance meter (BM-5A, manufactured TOPCON CORPORATION) is used for the measurement of the brightness, and the measurement angle of the color hue luminance meter is set to 1° and the measurement is carried out on a visual field of φ5 mm on a sample. The quantity of light of the backlight is set so as to give a brightness of 3600 cd/m² when two polarizers are arranged in parallel nicol in a state of without setting a sample.

The optical layered body of the present invention can be produced by forming a hard coat layer using a composition for a hard coat layer containing, for example, inorganic oxide fine particles, monomer components of a binder resin, and a solvent on a light-transmitting substrate.

The composition for a hard coat layer and the method for forming the hard coat layer may be the same material and method as those described in the method for forming the hard coat layer.

The optical layered body of the present invention is used for producing a polarizer by forming the optical layered body of the present invention on the surface of a polarizing element in such a manner that the surface of the optical layered body opposite to the surface on which the hard coat layer exists is set in the polarizing element. The present invention also provides such a polarizer.

The polarizing element is not particularly limited and for example, a polyvinyl alcohol film, a polyvinyl formal film, a polyvinyl acetal film, a saponified film including an ethylene-vinyl acetate copolymer, and the like which are dyed by iodine or the like and stretched may be used. In the lamination treatment of the polarizing element and the optical layered body of the present invention, a saponification treatment is preferably carried out for the light-transmitting substrate (triacetyl cellulose film). The adhesiveness is made excellent and an anti-static effect can be obtained by the saponification treatment.

The present invention also provides an image display device having the optical layered body or the polarizer.

The image display device may be an image display device such as an LCD, a PDP, an FED, an ELD (organic EL, inorganic EL), a CRT, a tablet PC, a touch panel, or electronic paper.

An LCD, a representative example of the image display device, is equipped with a transmission display body and a light source device for irradiation of the transmission display body from the back side. In the case where the image display device of the present invention is an LCD, the optical layered body of the present invention or the polarizer of the present invention is formed on the surface of the transmission display body.

In the case where the image display device of the present invention is a liquid crystal device having the optical layered body, the light source of the light source device irradiates light from the lower side of the optical layered body. In addition, a retardation plate may be inserted between a liquid crystal display element and a polarizer. If necessary, an adhesive layer may be formed between respective layers of the liquid crystal display device.

A PDP, the image display device, has a front glass substrate (having an electrode on the surface) and a back glass substrate (having an electrode, and fine grooves on the surface and red-, green-, and blue-phosphor layers in the grooves) arranged on the opposite to the front glass substrate while enclosing a discharge gas therebetween. In the case where the image display device of the present invention is a PDP, the optical layered body is formed on the surface of the front glass substrate or a front plate (a glass substrate or a film substrate).

The image display device may be an ELD device obtained by depositing zinc sulfide and a diamine substance: a phosphor, which emit light when voltage is applied, on the glass substrate, for carrying out display by controlling the voltage to be applied to the substrate, or may be an image display device such as CRT for generating an image to be seen by the eyes of human being with electric signals being converted into light. In this case, the outermost surfaces of the display devices or the surfaces of their front plates are provided with the optical layered body described above.

Any image display device of the present invention can be used for displays of a television, computer, electronic paper, touch panel, tablet PC, and the like. Particularly, the image display device can be used suitably for the surfaces of displays for high definition images such as a CRT, a liquid crystal panel, a PDP, an ELD, a FED, and a touch panel.

Advantageous Effects of Invention

Since having the above-mentioned configuration, the optical layered body of the present invention does not give white muddiness, sufficiently suppresses generation of interference fringes and curls, makes the hard coat layer thin, and prevents an increase in production cost.

Accordingly, the optical layered body of the present invention can be used suitably for a cathode-ray tube display device (CRT), a liquid crystal display (LCD), a plasma display (PDP), an electroluminescence display (ELD), a field-emission display (FED), electronic paper, and the like.

BRIEF DESCRIPTION OF DRAWING

FIG. 1 is an illustrative diagram for a θa measurement method.

DESCRIPTION OF EMBODIMENTS

The contents of the present invention will be described with reference to the following examples; however, the contents thereof should not be construed as limited to the embodiments. Unless otherwise specified, "part(s)" and "%" are based on weight.

EXAMPLE 1

A light-transmitting substrate (triacetyl cellulose resin film with a thickness of 60 μm, TD 60 UL, manufactured by FUJIFILM Corporation) was made ready, and a composition for a hard coat layer with composition as follows was applied to one surface of the light-transmitting substrate to form a coating film. Next, dried air at 70° C. was allowed to pass at a velocity of 0.2 m/second for 15 seconds to the formed coating film, and thereafter dried air at 70° C. was allowed to pass at a velocity of 10 m/second for 30 seconds to dry the coating film and evaporate the solvent from the coating film, and then using an ultraviolet irradiation device (Light source H bulb, manufactured by Fusion UV Systems Japan KK), ultraviolet rays were irradiated in a nitrogen atmosphere (oxygen concentration 200 ppm or lower) so as to adjust the integral of light to 100 mJ/cm$^2$ to cure the coating film and form a hard coat layer with a thickness of 4 µm (at the time of being cured), and thus an optical layered body of Example 1 was prepared.

(Composition for Hard Coat Layer)

Fumed silica (Octylsilane-treated; average particle diameter 12 nm; manufactured by Nippon Aerosil Co., Ltd.) 1 part by weight Pentaerythritol tetraacrylate (PETTA) (product name: PETA, manufactured by DAICEL-CYTEC Company, Ltd.) 60 parts by weight Urethane acrylate (product name: UV 1700B, manufactured by the Nippon Synthetic Chemical Industry Co., Ltd.) 40 parts by weight Irgacure 184 (manufactured by BASF Japan Ltd.) 5 parts by weight Polyether-modified silicone (TSF 4460, manufactured by Momentive Performance Materials Inc.) 0.025 parts by weight Toluene 105 parts by weight Isopropyl alcohol 30 parts by weight Cyclohexanone 15 parts by weight Fumed silica was hydrophobized by replacing silanol groups with octylsilyl groups with the use of an octyl group-containing silane compound (e.g., octylsilane).

EXAMPLE 2

A composition for a hard coat layer was prepared in the same manner as in Example 1, except that the addition amount of fumed silica was changed to 1.5 parts by weight, and an optical layered body of Example 2 was prepared in the same manner as in. Example 1, except that the composition for a hard coat layer was used.

EXAMPLE 3

A composition for a hard coat layer was prepared in the same manner as in Example 1, except that the addition amount of fumed silica was changed to 0.5 parts by weight, and an optical layered body of Example 3 was prepared in the same manner as in Example 1, except that the composition for a hard coat layer was used.

EXAMPLE 4

A composition for a hard coat layer was prepared in the same manner as in Example 1, except that the addition amount of fumed silica was changed to 2.5 parts by weight, and an optical layered body of Example 4 was prepared in the same manner as in Example 1, except that the composition for a hard coat layer was used.

EXAMPLE 5

A light-transmitting substrate (triacetyl cellulose resin film with a thickness of 60 µm, TD 60 UL, manufactured by FUJIFILM Corporation) was made ready, and a composition for a hard coat layer with composition as follows was applied to one surface of the light-transmitting substrate to form a coating film. Next, dried air at 70° C. was allowed to pass at a velocity of 0.2 m/second for 15 seconds to the formed coating film, and thereafter dried air at 70° C. was allowed to pass at a velocity of 10 m/second for 30 seconds to dry the coating film and evaporate the solvent from the coating film, and then using an ultraviolet irradiation device (Light source H bulb, manufactured by Fusion UV Systems Japan KK), ultraviolet rays were irradiated in a nitrogen atmosphere (oxygen concentration 200 ppm or lower) so as to adjust the integral of light to 50 mJ/cm$^2$ to cure the coating film and form a hard coat layer with a thickness of 4 µm (at the time of being cured).

(Composition for Hard Coat Layer)

Fumed silica (Octylsilane-treated; average particle diameter 12 nm; manufactured by Nippon Aerosil Co., Ltd.) 1 part by weight Pentaerythritol tetraacrylate (PETTA) (product name: PETA, manufactured by DAICEL-CYTEC Company, Ltd.) 60 parts by weight Urethane acrylate (product name: UV 1700B, manufactured by the Nippon Synthetic Chemical Industry Co., Ltd.) 40 parts by weight Irgacure 184 (manufactured by BASF Japan Ltd.) 5 parts by weight Polyether-modified silicone (TSF 4460, manufactured by Momentive Performance Materials Inc.) 0.025 parts by weight Toluene 105 parts by weight Isopropyl alcohol 30 parts by weight Cyclohexanone 15 parts by weight Fumed silica was hydrophobized by replacing silanol groups with octylsilyl groups with the use of an octyl group-containing silane compound (e.g., octylsilane).

Next, a composition for a low refractive index layer with the following composition was applied to the surface of the formed hard coat layer in a manner of giving a thickness of 0.1 µm after drying (40° C.×1 minute), and the composition was cured by ultraviolet irradiation with a integral of light of 100 mJ/cm$^2$ by using an ultraviolet irradiation device (Light source H bulb, manufactured by Fusion UV Systems Japan KK) in a nitrogen atmosphere (oxygen concentration 200 ppm or lower) to form a low refractive index layer and thus an optical layered body of Example 5 was produced.

(Composition for Low Refractive Index Layer)

Hollow silica fine particles (solid matter of silica fine particles: 20 wt %, solution; methyl isobutyl ketone, average particle diameter: 50 nm) 40 parts by weight Pentaerythritol triacrylate (PETA) (manufactured by DAICEL-CYTEC Company, Ltd.) 10 parts by weight Polymerization initiator (Irgacure 127; manufactured by BASF Japan Ltd.) 0.35 parts by weight Modified silicone oil (X22164E; manufactured by Shin-Etsu Chemical Co., Ltd.) 0.5 parts by weight MIBK 320 parts by weight PGMEA 161 parts by weight

EXAMPLE 6

A composition for a hard coat layer was prepared in the same manner as in Example 1, except that the addition amount of fumed silica was changed to 1.5 parts by weight, and an optical layered body of Example 6 was prepared in the same manner as in Example 5, except that the composition for a hard coat layer was used.

EXAMPLE 7

A composition for a hard coat layer was prepared in the same manner as in Example 1, except that the addition amount of fumed silica was changed to 0.5 parts by weight, and an optical layered body of Example 7 was prepared in the same manner as in Example 5, except that the composition for a hard coat layer was used.

EXAMPLE 8

A composition for a hard coat layer was prepared in the same manner as that in Example 5, except that the addition amount of fumed silica was changed to 2.5 parts by weight, and an optical layered body of Example 8 was prepared in the same manner as in Example 5, except that the composition for a hard coat layer was used.

COMPARATIVE EXAMPLE 1

A composition for a hard coat layer was prepared in the same manner as in Example 1, except that no fumed silica was added, and an optical layered body of Comparative Example 1 was prepared in the same manner as in Example 1, except that the composition for a hard coat layer was used.

COMPARATIVE EXAMPLE 2

A coating film was formed in the same manner as in Examples 1, except that a composition for a hard coat layer with the following composition was used. Next, dried air at 70° C. was allowed to pass at a velocity of 0.2 m/second for 15 seconds to the formed coating film, and thereafter dried air at 70° C. was allowed to pass at a velocity of 10 m/second for 30 seconds to dry the coating film and evaporate the solvent from the coating film, and then using an ultraviolet irradiation device (Light source H bulb, manufactured by Fusion UV Systems Japan KK), ultraviolet rays were irradiated in a nitrogen atmosphere (oxygen concentration 200 ppm or lower) so as to adjust the integral of light to 100 mJ/cm$^2$ to cure the coating film and form a hard coat layer with a thickness of 10 μm (at the time of being cured), and thus an optical layered body of Comparative Example 2 was prepared.
(Composition for Hard Coat Layer)
Pentaerythritol triacrylate (PETA) (product name: PET 30, manufactured by NIPPON KAYAKU Co., Ltd.) 100 parts by weight
Irgacure 184 (manufactured by BASF Japan Ltd.) 5 parts by weight
Polyether-modified silicone (TSF 4460, manufactured by Momentive Performance Materials Inc.) 0.025 parts by weight
Methyl ethyl ketone (MEK) 80 parts by weight
Methyl isobutyl ketone (MIRK) 35 parts by weight

COMPARATIVE EXAMPLE 3

A composition for a hard coat layer was prepared in the same manner as in Example 1, except that 3 parts by weight of organic fine particles (hydrophilized acrylic-styrene copolymer particles; average particle diameter 2.0 μm; refractive index 1.55; manufactured by SEKISUI PLASTICS CO., Ltd.) were added, and an optical layered body of Comparative Example 3 was prepared in the same manner as in Example 1, except that the composition for a hard coat layer was used.

COMPARATIVE EXAMPLE 4

A composition for a hard coat layer was prepared in the same manner as in Example 1, except that 1.5 parts by weight of organic fine particles (hydrophilized acrylic-styrene copolymer particles; average particle diameter 2.0 μm; refractive index 1.515; manufactured by SEKISUI PLASTICS CO., Ltd.) were added, and an optical layered body of Comparative Example 4 was prepared in the same manner as in Example 1, except that the composition for a hard coat layer was used.

COMPARATIVE EXAMPLE 5

A composition for a hard coat layer was prepared in the same manner as in Example 1, except that the addition amount of fumed silica was changed to 4 parts by weight, and an optical layered body of Comparative Example 5 was prepared in the same manner as in Example 1, except that the composition for a hard coat layer was used.

COMPARATIVE EXAMPLE 6

A composition for a hard coat layer was prepared in the same manner as in Example 5, except that no fumed silica was added, and an optical layered body of Comparative Example 6 was prepared in the same manner as in Example 5, except that the composition for a hard coat layer was used.

COMPARATIVE EXAMPLE 7

A coating film was formed in the same manner as in Examples 5, except that a composition for a hard coat layer with the following composition was used. Next, dried air at 70° C. was allowed to pass at a velocity of 0.2 m/second for 15 seconds to the formed coating film, and thereafter dried air at 70° C. was allowed to pass at a velocity of 10 m/second for 30 seconds to dry the coating film and evaporate the solvent from the coating film, and then using an ultraviolet irradiation device (Light source H bulb, manufactured by Fusion UV Systems Japan KK), ultraviolet rays were irradiated in a nitrogen atmosphere (oxygen concentration 200 ppm or lower) so as to adjust the integral of light to 50 mJ/cm$^2$ to cure the coating film and form a hard coat layer with a thickness of 10 mm (at the time of being cured), and then a low refractive index layer was formed in the same manner as in Example 5, and thus an optical layered body of Comparative Example 7 was prepared.
(Composition for Hard Coat Layer)
Pentaerythritol triacrylate (PETA) (product name: PET 30, manufactured by NIPPON KAYAKU Co., Ltd.) 100 parts by weight
Irgacure 184 (manufactured by BASF Japan Ltd.) 5 parts by weight
Polyether-modified silicone (TSF 4460, manufactured by Momentive Performance Materials Inc.) 0.025 parts by weight
Methyl ethyl ketone (MEK) 80 parts by weight
Methyl isobutyl ketone (MIBK) 35 parts by weight

COMPARATIVE EXAMPLE 8

A composition for a hard coat layer was prepared in the same manner as in Example 5, except that 3 parts by weight of organic fine particles (hydrophilized acrylic-styrene copolymer particles; average particle diameter 2.0 μm; refractive index 1.55; manufactured by SEKISUI PLASTICS CO., Ltd.) were added, and an optical layered body of Comparative Example 8 was prepared in the same manner as in Example 5, except that the composition for a hard coat layer was used.

COMPARATIVE EXAMPLE 9

A composition for a hard coat layer was prepared in the same manner as in Example 5, except that 1.5 parts by weight of organic fine particles (hydrophilized acrylic-styrene copolymer particles; average particle diameter 2.0 μm; refractive index 1.515; manufactured by SEKISUI PLASTICS CO., Ltd.) were added, and an optical layered body of Comparative Example 9 was prepared in the same manner as in Example 5, except that the composition for a hard coat layer was used.

COMPARATIVE EXAMPLE 10

A composition for a hard coat layer was prepared in the same manner as in Example 5, except that the addition amount of fumed silica was changed to 4 parts by weight, and an optical layered body of Comparative Example 10 was prepared in the same manner as in Example 5, except that the composition for a hard coat layer was used.

The following items were evaluated for the obtained optical layered bodies of examples and comparative examples.
Table 1 shows all results.
(Average Inclination Angle (θa) of Uneven Part; Kurtosis (Kr) of Unevenness; Arithmetic Mean Roughness (Ra) of Unevenness)

The roughness curve was measured in accordance with JIS B 0601-1994 under the following conditions by using a surface
roughness measurement device: SE-3400, manufactured by Kosaka Laboratory Ltd. to measure θa, Kr, and Ra.
(1) Probe of Surface Roughness Detection Part:
Model/SE2555N (2μ probe), manufactured by Kosaka Laboratory Ltd.
(Tip Curvature Radius 2 μm/apex: 90 Degrees/material: Diamond)
(2) Measurement Conditions of Surface Roughness Measurement Device:
Standard length (cut-off value of roughness curve λc): 2.5 mm
Evaluation length (standard length (cut-off value λc)×5): 12.5 mm
Probe sending rate: 0.5 mm/second
Reserve length: (cut-off value λc)×2

Vertical magnification: 2000 times
Transverse magnification: 10 times
Generally, the cut-off value is often 0.8 mm, but in the present invention, the cut-off value was set to 2.5 mm for the measurement.
λa was calculated according to the expression: $\lambda a = 2\pi \times (Ra/\tan(\theta a))$.
(Haze)
The haze of each of the obtained optical layered bodies was measured in accordance with JIS K7136 by using a haze meter HM-150 (manufactured by MURAKAMI COLOR RESEARCH LABORATORY).
(Transmission Image Clarity)
The transmission image clarity of each of the obtained optical layered bodies with 0.125 mm comb width and 2.0 mm comb width was measured by a transmission measurement method in accordance with JIS K 7105 by using an image clarity measurement device ICM-1T (manufactured by Suga Test Instruments Co., Ltd.).
(Interference Fringes)
The surface (light-transmitting substrate surface) opposite to the hard coat layer of each optical layered body obtained in examples and comparative examples was stuck to a black acrylic plate with a transparent pressure-sensitive adhesive for preventing reflection on the rear surface, and each optical layered body was irradiated with sodium lamp from the hard coat layer surface, and occurrence of interference fringes was observed with eyes and evaluated according to the following criteria.
Excellent: Interference fringes were not at all generated.
Good: Interference fringes were slightly generated, but the generation was in negligible level.
Poor: Interference fringes were generated.
(White Muddiness)
The surface (light-transmitting substrate surface) opposite to the hard coat layer of each optical layered body obtained in examples and comparative examples was stuck to a black acrylic plate with a transparent pressure-sensitive adhesive, and white muddiness was observed in a darkroom under light of a table stand (three-wavelength fluorescent lamp) and evaluated according to the following criteria.
Good: No whiteness was observed.
Poor: Whiteness was observed.
(Curl)
The curling degree of an optical layered body was measured by placing a sample specimen, which was obtained by cutting each optical layered body of examples and Comparative examples into a size of 10 cm×10 cm, on a horizontal stand (plane), measuring the distance between terminal points of the hard coat layer, and evaluating the average value (mm) of the distance as follows.
Good: 80 mm or more.
Poor: lower than 80 mm.

TABLE 1

| | Roughness parameters | | | | Transmission image clarity (%) | | | | |
| --- | --- | --- | --- | --- | --- | --- | --- | --- | --- |
| | θa (°) | Kr | Ra (μm) | λa (μm) | Haze (%) | 0.125 mm comb width | 2.0 mm comb width | Interference fringes | White muddiness | Curl |
| Example 1 | 0.054 | 2.70 | 0.0493 | 329 | 0.2 | 86.9 | 97.3 | Excellent | Good | Good |
| Example 2 | 0.057 | 2.78 | 0.0609 | 385 | 0.2 | 84.2 | 97.2 | Excellent | Good | Good |
| Example 3 | 0.025 | 2.74 | 0.0386 | 556 | 0.2 | 93.7 | 98.2 | Good | Good | Good |
| Example 4 | 0.087 | 2.84 | 0.0723 | 299 | 0.2 | 76.0 | 97.0 | Excellent | Good | Good |
| Example 5 | 0.052 | 2.61 | 0.0481 | 333 | 0.2 | 88.2 | 97.5 | Excellent | Good | Good |
| Example 6 | 0.053 | 2.67 | 0.0596 | 405 | 0.2 | 85.3 | 97.9 | Excellent | Good | Good |
| Example 7 | 0.023 | 2.69 | 0.0366 | 573 | 0.2 | 94.1 | 98.6 | Good | Good | Good |
| Example 8 | 0.082 | 2.74 | 0.0701 | 308 | 0.2 | 77.5 | 97.8 | Excellent | Good | Good |

TABLE 1-continued

| | Roughness parameters | | | | Transmission image clarity (%) | | | | |
|---|---|---|---|---|---|---|---|---|---|
| | θa (°) | Kr | Ra (μm) | λa (μm) | Haze (%) | 0.125 mm comb width | 2.0 mm comb width | Interference fringes | White muddiness | Curl |
| Comparative Example 1 | 0.008 | 2.54 | 0.0287 | 1291 | 0.2 | 98.1 | 99.0 | Poor | Good | Good |
| Comparative Example 2 | 0.009 | 2.67 | 0.0296 | 1184 | 0.2 | 98.0 | 99.1 | Good | Good | Poor |
| Comparative Example 3 | 0.205 | 3.97 | 0.0833 | 146 | 3.5 | 65.0 | 94.2 | Excellent | Poor | Good |
| Comparative Example 4 | 0.084 | 3.44 | 0.0565 | 242 | 0.5 | 88.0 | 96.4 | Excellent | Poor | Good |
| Comparative Example 5 | 0.123 | 2.84 | 0.0865 | 253 | 0.4 | 72.1 | 96.2 | Excellent | Poor | Good |
| Comparative Example 6 | 0.008 | 2.49 | 0.0276 | 1242 | 0.2 | 98.3 | 99.2 | Poor | Good | Good |
| Comparative Example 7 | 0.008 | 2.55 | 0.0288 | 1296 | 0.2 | 98.2 | 99.2 | Good | Good | Poor |
| Comparative Example 8 | 0.199 | 3.79 | 0.0812 | 147 | 3.3 | 67.2 | 95.0 | Excellent | Poor | Good |
| Comparative Example 9 | 0.080 | 3.30 | 0.0548 | 247 | 0.4 | 88.8 | 97.1 | Excellent | Poor | Good |
| Comparative Example 10 | 0.120 | 2.76 | 0.0842 | 253 | 0.4 | 73.6 | 97.2 | Excellent | Poor | Good |

As shown in Table 1, the optical layered bodies of examples were evaluated to be excellent in all of interference fringes, white muddiness, and curls.

On the other hand, the optical layered bodies of Comparative Examples 1 and 6 had an average inclination angle of the surface of the hard coat layer or low refractive index layer so small that interference fringes could not be prevented. The optical layered bodies of Comparative Examples 2 and 7 were made to lower the light reflected on the interface of the hard coat layer and the light-transmitting substrate and thus were prevented from generation of interference fringes by using MEK for swelling the light-transmitting substrate of the composition for a hard coat layer and increasing the application amount so that the hard coat layer had a thickness of 10 μm, but were inferior in the evaluation of curls. The optical layered bodies of Comparative Examples 3 to 5 and 8 to 10 had too high values for one or both of the average inclination angle and Kurtosis and thus were inferior in white muddiness.

Industrial Applicability

The optical layered body of the present invention can be used suitably for a cathode-ray tube display device (CRT), a liquid crystal display (LCD), a plasma display (PDP), an electroluminescence display (ELD), a field-emission display (FED), a touch panel, electronic paper, a tablet PC, and the like.

The invention claimed is:

1. An optical layered body having a hard coat layer formed on one surface of a light-transmitting substrate, wherein said hard coat layer has a surface roughness on its surface and the surface roughness satisfies the following inequalities of θa and Kr where θa is an average inclination angle of the uneven part and Kr is Kurtosis of the unevenness:

$0.01° \geq θa \geq 0.09°$ $1 \leq Kr \leq 3$.

2. The optical layered body according to claim 1, wherein the surface roughness of the hard coat layer satisfies the following inequality of Ra when Ra is defined as the arithmetic means roughness of the unevenness:

$0.02 \,\mu m \leq Ra \leq 0.10 \,\mu m$.

3. The optical layered body according to claim 2, wherein the surface roughness of the hard coat layer satisfies the following inequality of λa where λa is average wavelength defined as $λa = 2π \times (Ra/\tan(θa))$:

$200 \,\mu m \leq λa \leq 800 \,\mu m$.

4. The optical layered body according to claim 1, wherein the hard coat layer contains inorganic oxide fine particles and a binder resin.

5. The optical layered body according to claim 4, wherein the inorganic oxide fine particles are hydrophobized inorganic oxide fine particles.

6. The optical layered body according to claim 4, wherein the inorganic oxide fine particles are formed into agglomerates to be contained in the hard coat layer, and the average particle diameter of said agglomerates is 100 nm to 2.0 μm.

7. The optical layered body according to claim 1, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

8. A polarizer comprising a polarizing element, wherein said polarizer has the optical layered body according to claim 1, on the polarizing element surface.

9. An image display device comprising an optical layered body having a hard coat layer formed on one surface of a light-transmitting substrate, wherein said hard coat layer has a surface roughness on its surface and the surface roughness satisfies the following inequalities of θa and Kr where θa is an average inclination angle of the uneven part and Kr is Kurtosis of the unevenness:

$0.01° \leq θa \leq 0.09°$ $1 \leq Kr \leq 3$, or the polarizer according to claim 8.

10. The optical layered body according to claim 2 wherein the hard coat layer contains inorganic oxide fine particles and a binder resin.

11. The optical layered body according to claim 3 wherein the hard coat layer contains inorganic oxide fine particles and a binder resin.

12. The optical layered body according to claim 5, wherein the inorganic oxide fine particles are formed into agglomerates to be contained in the hard coat layer, and the average particle diameter of said agglomerates is 100 nm to 2.0 μm.

13. The optical layered body according to claim 2, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

14. The optical layered body according to claim 3, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

15. The optical layered body according to claim 4, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

16. The optical layered body according to claim 5, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

17. The optical layered body according to claim 6, wherein the optical layered body has a low refractive index layer on the surface of the hard coat layer in the side opposite to the light-transmitting substrate side, and said low refractive index layer has a surface roughness corresponding to the surface roughness formed on the surface of said hard coat layer in the surface side opposite to said hard coat layer side.

18. A polarizer comprising a polarizing element, wherein said polarizer has the optical layered body according to claim 2 on the polarizing element surface.

19. A polarizer comprising a polarizing element, wherein said polarizer has the optical layered body according to claim 3 on the polarizing element surface.

20. A polarizer comprising a polarizing element, wherein said polarizer has the optical layered body according to claim 4 on the polarizing element surface.

* * * * *

UNITED STATES PATENT AND TRADEMARK OFFICE
CERTIFICATE OF CORRECTION

PATENT NO. : 9,146,335 B2
APPLICATION NO. : 13/766804
DATED : September 29, 2015
INVENTOR(S) : Ogumi et al.

It is certified that error appears in the above-identified patent and that said Letters Patent is hereby corrected as shown below:

On the Title Page:

Item [57], "$0.01° \leq \theta a \geq 0.10°$" should read --$0.01° \leq \theta a \leq 0.10°$--.

In the Claims:

At column 23, claim 1, line 62, "$0.01° \geq \theta a \geq 0.09°$" should read --$0.01° \leq \theta a \leq 0.09°$--.

Signed and Sealed this
Twenty-fourth Day of May, 2016

Michelle K. Lee
*Director of the United States Patent and Trademark Office*